(12) United States Patent
Feine et al.

(10) Patent No.: US 8,464,495 B1
(45) Date of Patent: Jun. 18, 2013

(54) WALL ANCHOR

(76) Inventors: James S. Feine, Bellaire, TX (US); Mohammad A. Jamnia, Pleasant Prairie, WI (US)

(*) Notice: Subject to any disclaimer, the term of this patent is extended or adjusted under 35 U.S.C. 154(b) by 173 days.

(21) Appl. No.: 13/050,014

(22) Filed: Mar. 17, 2011

Related U.S. Application Data

(60) Provisional application No. 61/314,947, filed on Mar. 17, 2010.

(51) Int. Cl.
  *E04B 1/00* (2006.01)
(52) U.S. Cl.
  USPC ........................ 52/741.4; 52/745.21
(58) Field of Classification Search
  USPC ............ 411/23, 82.1; 52/741.4, 745.21, 52/742.13, 698, 705, 707
  See application file for complete search history.

(56) References Cited

U.S. PATENT DOCUMENTS

| | | | | |
|---|---|---|---|---|
| 3,108,404 | A * | 10/1963 | Lamb | 52/127.4 |
| 4,390,333 | A * | 6/1983 | Dubois | 425/11 |
| 5,007,780 | A * | 4/1991 | Hoffmann et al. | 411/82.3 |
| 5,339,593 | A * | 8/1994 | Ludwig et al. | 52/707 |
| 5,725,341 | A | 3/1998 | Hofmeister | |
| 6,837,659 | B2 * | 1/2005 | Oberkofler | 411/82.1 |
| 2011/0094181 | A1 * | 4/2011 | Hanratty | 52/698 |

OTHER PUBLICATIONS

"Using Wall Anchors Including Molly and Toggle Bolts, Plastic Anchors, Expansion Anchors and More"; http://www.naturalhandyman.com/iip/inf/inffastener/infanchor/infanchor.html; Natural Handyman Home Repair and Do It Yourself Website.

* cited by examiner

*Primary Examiner* — Jeanette E Chapman
*Assistant Examiner* — Daniel Kenny
(74) *Attorney, Agent, or Firm* — Daniel N. Lundeen; Lundeen & Lundeen PLLC

(57) ABSTRACT

A wall anchor employing adhesives or other settable materials to strengthen the wall anchor, facilitating ease of use as well as extreme holding power. A method to attach a wall anchor to a panel, a method to remove a wall anchor from a panel, and a removal tool is also disclosed.

20 Claims, 6 Drawing Sheets

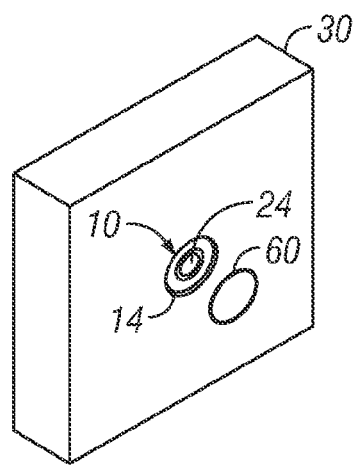
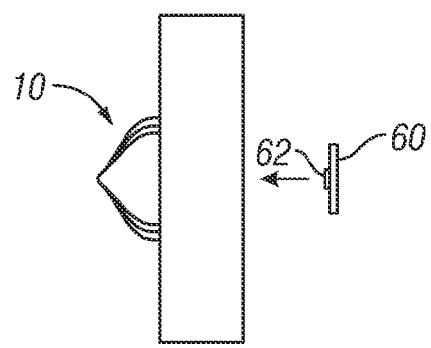
FIG. 10
FIG. 11
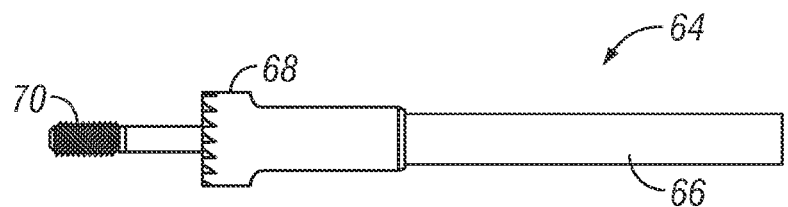
FIG. 12
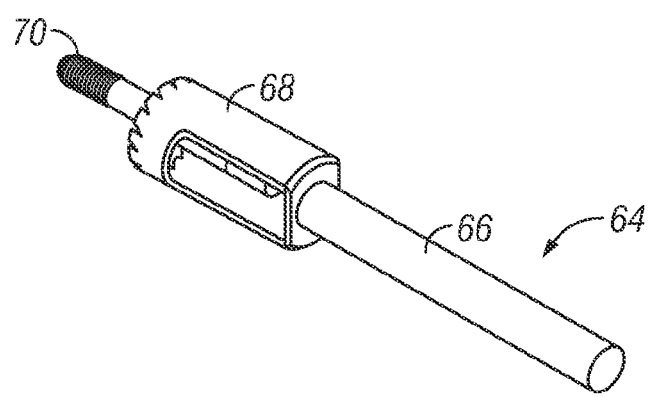
FIG. 13

WALL ANCHOR

CROSS REFERENCE TO RELATED APPLICATIONS

This application claims priority to, and is a non-provisional of U.S. 61/314,947, filed Mar. 17, 2010, which is incorporated by reference herein in its entirety.

BACKGROUND

Wall anchors are used to attach items to wall panels. Types of wall anchors range from a nail to a toggle bolt to molly bolts, to threaded drywall anchors.

While useful in many situations, each type has limitations which must be observed or failure may result. Most wall anchors fail when they are unable to maintain their grip on the wall material. They may be strong enough initially, but lose their hold after a period of time.

Failure may also occur depending upon the force placed on the wall anchor. Some wall anchors may work well if the force applied to them is in a downward direction (shear force), but fail if the force is applied outward (tension force).

U.S. Pat. No. 5,725,341 discloses a self fusing fastener said to contain an adhesive. Additional background information on wall anchors is disclosed in "Using Wall Anchors Including Molly and Toggle Bolts, Plastic Anchors, Expansion Anchors and More," from the Natural Handyman Home Repair and Do It Yourself Website, available at http://www.naturalhandyman.com/iip/inffastener/infanchor/infanchor.html, which is fully incorporated herein by reference.

SUMMARY

Certain embodiments relate to a wall anchor, a method of installing a wall anchor, a wall anchor installation system and tool, a wall anchor removal tool and method, and other concepts related to wall anchors.

Certain embodiments relate to a system of wall anchors employing adhesives or other settable materials to strengthen the wall anchor, facilitating ease of use as well as extreme holding power.

In an embodiment, a wall anchor, comprises a head section comprising an external face separated from an internal face by a length along a central axis; an outer surface having an infinite number of sides radially disposed about the central axis; an access passage disposed through the head section along the central axis; an inflatable bladder attached to the internal face of the head section, the inflatable bladder being in fluid communication with an external environment through the access passage; wherein the head section is capable of being inserted into a hole disposed in a panel such that the external face of the wall anchor is capable of being in contact with an anterior surface of the panel; and wherein the inflatable bladder is dimensioned and arranged such that when a settable fluid is infused through the access passage into the inflatable bladder, the inflatable bladder expands such that the settable fluid, the inflatable bladder, or both are placed in contact with both the wall anchor and a posterior surface of the panel.

In an embodiment, a method to attach a wall anchor to a panel comprises the steps of: forming a hole in a panel; inserting a wall anchor into the hole, wherein the wall anchor comprises a head section comprising an external face separated from an internal face by a length along a central axis; an outer surface having an infinite number of sides radially disposed about the central axis; an access passage disposed through the head section along the central axis; an inflatable bladder attached to the internal face of the head section, the inflatable bladder being in fluid communication with an external environment through the access passage; contacting the external face of the wall anchor with an anterior surface of the panel; infusing a settable fluid through the access passage in an amount sufficient to at least partially expand the inflatable bladder such that the settable fluid, the inflatable bladder, or both are placed in contact with both the wall anchor and a posterior surface of the panel.

In an embodiment, a removal tool for removing the wall anchor according to the instant disclosure comprises a main shaft comprising a hole saw positioned radially around the main shaft at a first end, the hole saw having an inner diameter equal to or greater than an outer diameter of the external face of the wall anchor; a pilot rod extending along the axis of the main shaft beyond a face of the hole saw, the pilot rod being dimensioned to frictionally engage the access passage in the wall anchor.

In an embodiment, a method to remove a wall anchor engaged with a panel comprises the steps of rotating the removal tool disclosed herein while guiding the pilot rod into an access passage of a wall anchor such that the hole saw engages and cuts a hole in the panel circumscribing the wall anchor; followed by removing the removal tool from the hole along with the wall anchor.

The foregoing has outlined rather broadly the features and technical advantages disclosed herein in order that the detailed description that follows may be better understood. Additional features and advantages will be described hereinafter which form the subject of the claims.

BRIEF DESCRIPTION OF THE DRAWINGS

For a more complete understanding. and the advantages thereof, reference is now made to the following descriptions taken in conjunction with the accompanying drawings, in which:

FIG. 10 shows an embodiment in expanded view including a plug;

FIG. 11 shows an embodiment of a side expanded view of a wall anchor and a plug;

FIG. 12 shows a top view of an embodiment of a removal tool;

FIG. 13 shows a perspective side view of an embodiment of a removal tool;

DETAILED DESCRIPTION

Figure 1:
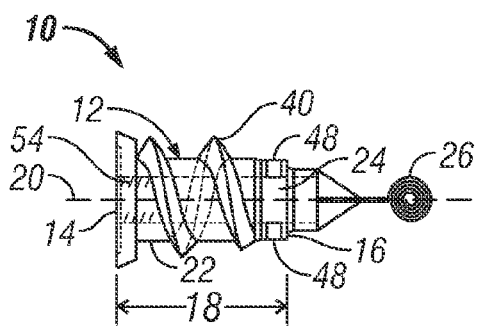
FIG. 1 is a side view of a wall anchor according to an embodiment.

The following detailed description is of the best currently contemplated modes of the instant disclosure. The description is not to be taken in a limiting sense, but is made merely for the purpose of illustrating the general principles disclosed herein, since the scope of the disclosure is best defined by the appended claims.

In the following description, numerous specific details are set forth to provide a thorough understanding of the instant disclosure. However, it will be obvious to those skilled in the art that the disclosure may be practiced without such specific details. In other instances, well-known devices have not been shown in order not to obscure the subject matter in unnecessary detail. For the most part, details unnecessary to obtain a complete understanding of the present disclosure have been omitted in as much as such details are within the skills of persons of ordinary skill in the relevant art.

Refer now to the drawings wherein depicted elements are not necessarily shown to scale and wherein like or similar elements are designated by the same reference numeral through the several views.

Figure 2:
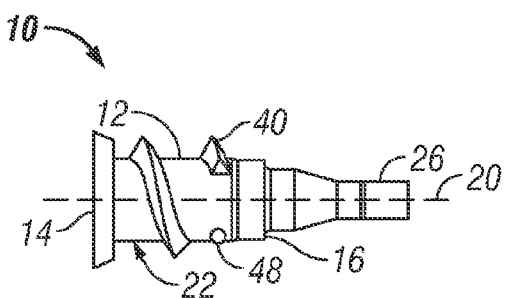
FIG. 2 is a top view of the wall anchor of FIG. 1.
Figure 3:
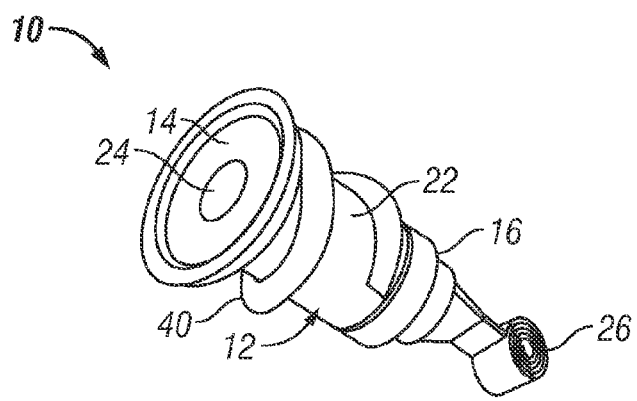
FIG. 3 is a perspective view of the wall anchor of FIGS. 1 and 2.
Figure 4:
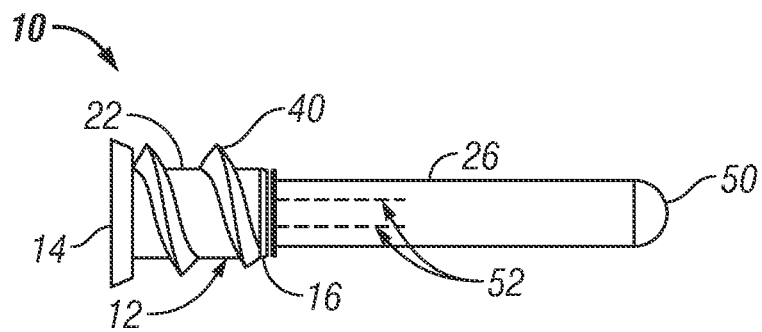
FIG. 4 is a side view of the wall anchor of FIG. 1 with the inflatable bladder in an expanded position.
Figure 5:
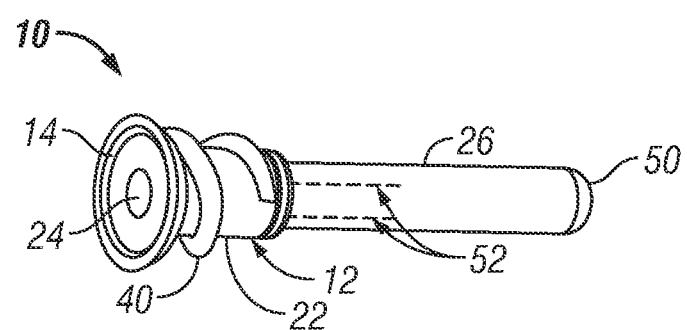
FIG. 5 is a perspective view of the wall anchor of FIG. 4.

FIG. 1 is a side view of a wall anchor 10 according to an embodiment. In an embodiment, wall anchor 10 comprises a head section 12 comprising an external face 14 separated from an internal face 16 by a length 18 along a central axis 20. In an embodiment, head section 12 comprises an outer surface 22 having an infinite number of sides radially disposed about central axis 20 (i.e., a circular cross section taken perpendicular to central axis 20). In an embodiment, wall anchor 10 further includes an access passage 24 disposed through head section 12 along central axis 20. In an embodiment, wall anchor 10 further includes an inflatable bladder 26 attached to internal face 16 of head section 12. In an embodiment, inflatable bladder 26 is in fluid communication with an external environment 28 through access passage 20. As shown in FIGS. 1, 2, and 3, inflatable bladder 26 may be in a collapsed configuration. FIGS. 4 and 5 show an embodiment wherein inflatable bladder 26 is in an expanded or an inflated configuration.

Figure 6:
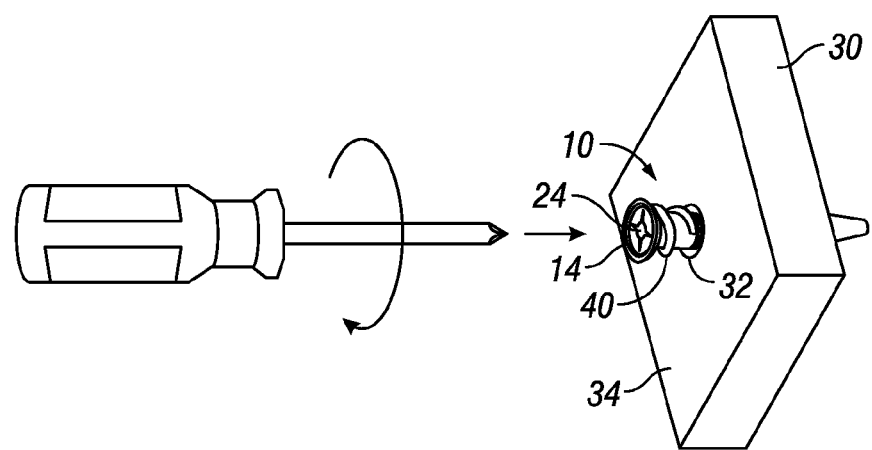
FIG. 6 is a schematic illustration showing an embodiment of a wall anchor engaged within a hole disposed through a panel.
Figure 7:
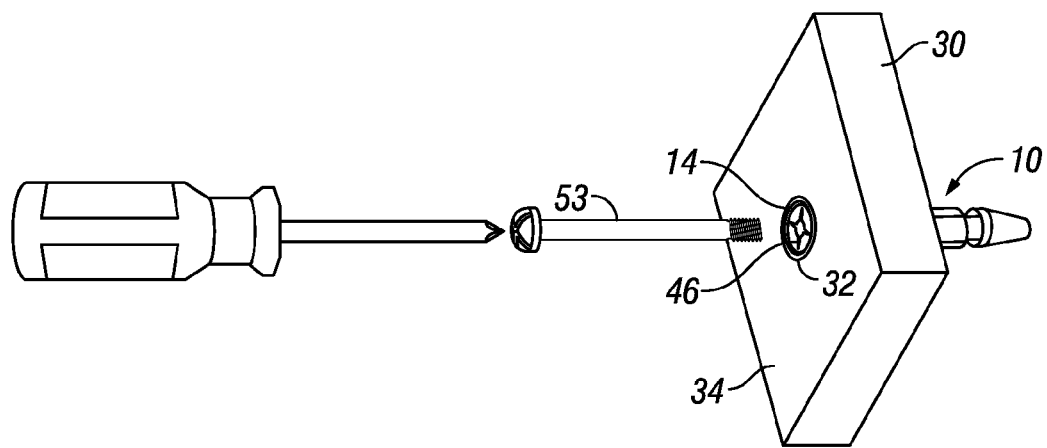
FIG. 7 shows an embodiment of the wall anchor engaged with a panel.
Figure 8:
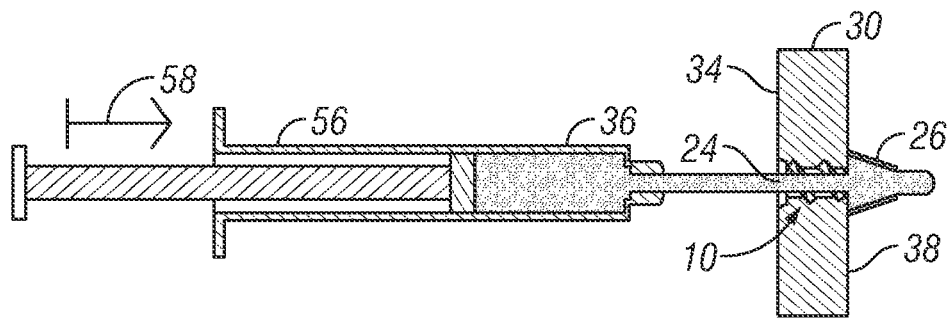
FIG. 8 is a side view of an embodiment of the wall anchor infused with a settable fluid such that the inflatable bladder is partially expanded and in contact with the wall anchor and an interior side of the panel.
Figure 9:
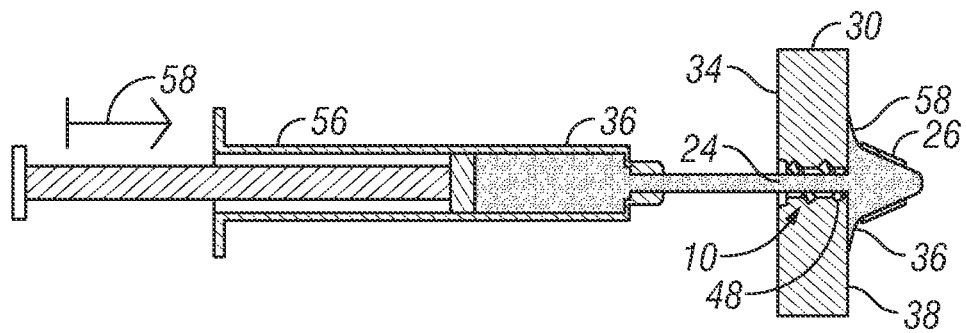
FIG. 9 is a side view of an embodiment of the wall anchor infused with a settable fluid such that the inflatable bladder is at least partially ruptured and the settable fluid is in contact with the wall anchor and an interior side of the panel.

In an embodiment, wall anchor 10 is dimensioned and arranged such that head section 12 is capable of being inserted into a hole 32 disposed in a panel 30 (See FIGS. 6 and 7) such that external face 14 of wall anchor 10 is capable of engaging an anterior surface 34 of panel 30 (See FIGS. 6 and 7). As shown in FIGS. 8 and 9, in an embodiment, inflatable bladder 26 is dimensioned and arranged such that when a settable fluid 36 is infused through access passage 24 into inflatable bladder 26, inflatable bladder 26 at least partially expands such that settable fluid 36, inflatable bladder 26, or both are placed in contact with both wall anchor 10 and a posterior surface 38 of panel 30.

In an embodiment, outer surface 22 of head section 12 comprises at least one external thread 40 extending outwardly away from outer surface 22. As shown in FIGS. 6 and 7, in an embodiment, the least one external thread 40 is dimensioned and arranged such that rotation 42 of wall anchor 10 within an appropriately sized hole 32 causes external face 14 of wall anchor 10 to engage the anterior surface 34 of panel 30. In an embodiment, the at least one external thread 40 is a self-tapping thread to form a hole in a panel.

As shown in FIG. 6, rotation 42 may be accomplished by inserting a drive tool (e.g., a screw driver) 44 at least partially into access passage 24. In an embodiment, the portion of access passage 24 present on external face 14 may include slots or divots 46 to accommodate insertion of a hexagon screw key or an end of screw driver 44 or other similar driving tools known to one of minimal skill in the art.

In an embodiment, wall anchor 10 may further comprise one or more lateral passages 48 in fluid communication with access passage 24 and an external environment 28. In an embodiment, lateral passage 48 may direct settable fluid 36 to be in contact with hole 32, interior surface 38 of panel 30, or a combination thereof.

As shown in FIGS. 4 and 5, in an embodiment, inflatable bladder 26 comprises an expandable polyolefin tube which is closed on one end 50 located opposite internal face 16. Inflatable bladder 26 may be attached to internal face 16 by an adhesive, by ultrasonic welding, or the like. In an embodiment, inflatable bladder 26 is integral to head section 12. In an embodiment, inflatable bladder 26 comprises an expandable tube comprising perforations 52.

In an embodiment, settable fluid 36 may comprise a rigid foam precursor which forms a rigid foam upon exposure to an external environment 28. In an embodiment, settable fluid 36 comprises an adhesive. In an embodiment, settable fluid 36 comprises a polyurethane adhesive, an epoxy resin, a polyester resin, a methacrylate resin, or a combination thereof.

As shown in FIG. 1, in an embodiment, access passage 24 comprises threads 54 to receive a screw or other threaded member 53, as shown in FIG. 7.

In an embodiment, the head section, the inflatable bladder, or a combination thereof may be produced by injection molding. In an embodiment, the head section may comprise a polyamide, polyolefin, polystyrene, or any combination thereof. In an embodiment, the head section may further include a metal insert disposed within the access passage, around the outer surface, or a combination thereof. In an embodiment, the head section is formed from metal, preferably an alloy.

Additional reinforcement is provided by the composite structure of the cured settable fluid. This arrangement thus provides for improved hanging capacity of the instant wall anchor over wall anchors known to one of skill in the art. In an embodiment, a wall anchor inserted into an appropriately sized hole in a standard type X ⅝" drywall panel which has been infused with a polyurethane glue (e.g., Gorilla Glue, The Gorilla Glue Company, Cincinnati, Ohio, USA) according to an embodiment disclosed herein is capable of supporting at least about 10 pounds static force, preferably at least about 50 pounds static force, preferably at least about 75 pounds static force, with at least about 100 pounds static force being more preferred.

In an embodiment, a method to attach a wall anchor to a panel comprises the steps of forming a hole in a panel; inserting a wall anchor into the hole, wherein the wall anchor comprises a head section comprising an external face separated from an internal face by a length along a central axis; an outer surface having an infinite number of sides radially disposed about the central axis; an access passage disposed through the head section along the central axis; an inflatable bladder attached to the internal face of the head section, the inflatable bladder being in fluid communication with an external environment through the access passage; contacting the external face of the wall anchor with an anterior surface of the panel; infusing a settable fluid through the access passage in an amount sufficient to at least partially expand the inflatable bladder such that the settable fluid, the inflatable bladder, or both are placed in contact with both the wall anchor and a posterior surface of the panel.

In an embodiment, a method to attach a wall anchor to a panel may further comprise the step of rotating the wall anchor within the hole in an amount sufficient to engage the external face of the wall anchor with an anterior surface of the panel; wherein the outer surface of the head section comprises at least one external thread extending outwardly away from the outer surface, wherein the at least one external thread is dimensioned and arranged such that rotation of the head section within the hole engages the external face of the wall anchor with an anterior surface of the panel.

In an embodiment, the at least one external thread of the wall anchor is a self-tapping thread to form a hole in a panel. Accordingly, in an embodiment, rotation of the wall anchor may produce the hole within the panel suitable to insert the wall anchor into to attach the wall anchor to the panel.

As shown in FIGS. 8 and 9, in an embodiment, the settable fluid may be infused through access passage 24 into inflatable bladder 26 using a syringe 56 with a cannula tip or the like, wherein the tip of syringe 56 is inserted into internal passage 24 an a pressure 58 is exerted onto the plunger of syringe 56 to infuse settable fluid 36 to expand inflatable bladder 26. In an embodiment, the tip of syringe 56 is preferably dimensioned to frictionally engage the access passage 24 to form a seal to retain the settable fluid 36 in access passage 24. As shown in FIG. 9, in an embodiment, an amount of settable fluid 36 is infused into the wall anchor to form a disk-like structure 58 in contact against the interior surface 38 of panel 30. In an embodiment, the cured settable fluid presents a larger cross-sectional contact area than is provided by external face 14 to distribute forces to a larger area of panel 30, thereby increasing the strength of the anchor.

In an embodiment, as shown in FIGS. 10 and 11, the wall anchor may further include a plug 60 having a nipple 62 dimensioned to engage access passage 24, external face 14 or a combination thereof, to cover wall anchor 10 when not in use. Plug 60 may further include an adhesive coating to adhere to external face 14 or a portion of panel 30 to cover the external face of the wall anchor.

In an embodiment, as shown in FIGS. 12 and 13, the wall anchor according to the instant disclosure may include a removal tool 64 comprising a main shaft 66 comprising a hole saw 68 dimensioned to have an inner diameter equal to or greater than an outer diameter of external face 14. Removal tool 64 may further include a pilot rod 70, oriented along a central axis of the main shaft which may be threaded, and which is dimensioned to frictionally engage access passage 24 of wall anchor 10.

Figure 14:
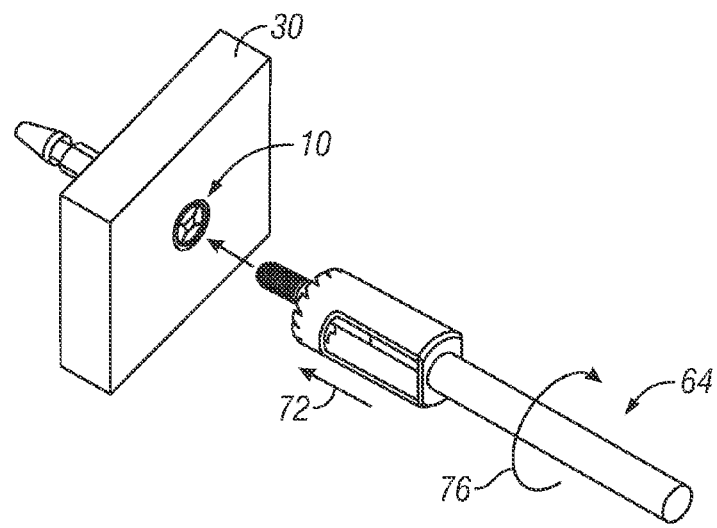
FIG. 14 shows a beginning step in an embodiment of a wall anchor removal process.
Figure 15:
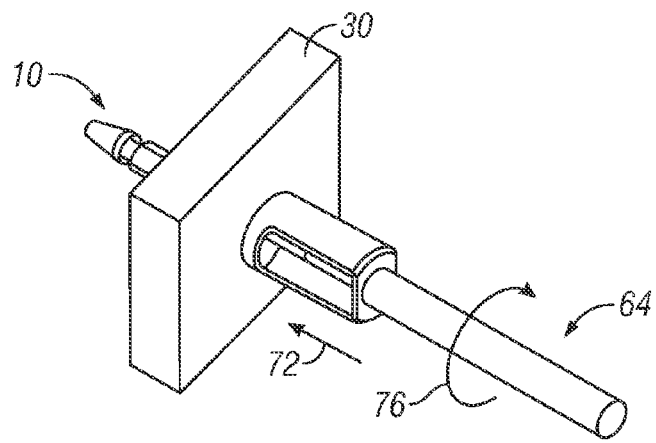
FIG. 15 shows a step in an embodiment of a wall anchor removal process.
Figure 16:
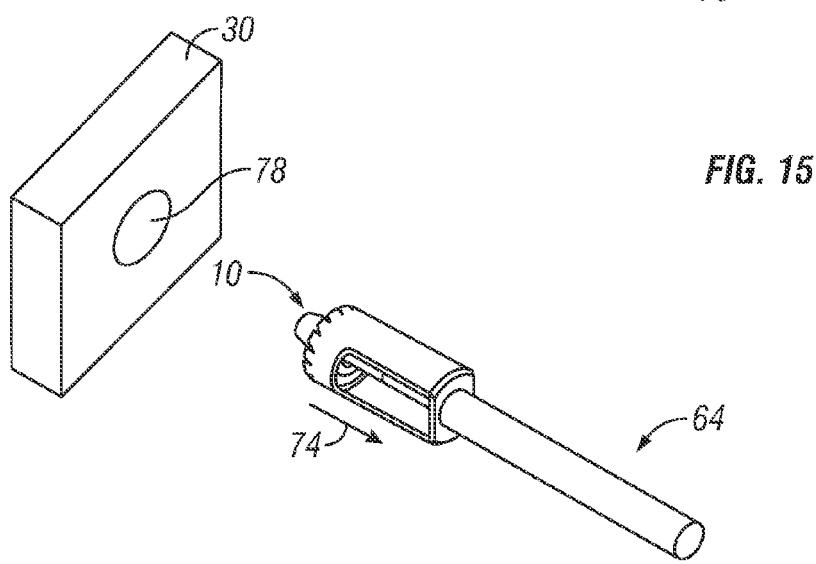
FIG. 16 shows a step in an embodiment of a wall anchor removal process with the wall anchor removed from the panel.

As shown in FIGS. 14, 15, and 16, in an embodiment, removal tool 64 may be rotated 76 with an electric drill (not shown) and pilot rod 70 guided into access passage 24 with a forward force 72 such that hole saw 68 cuts through panel 30. In an embodiment, a rear-ward force 74 may then be put on removal tool 64 to remove wall anchor 10 in concert with removal tool 64 leaving a secondary hole 78 in panel 30, which may be subsequently filled or plugged using methods known in the art to obscure the presence of the hole from vision.

It should be understood, of course, that the foregoing relates to preferred embodiments and that modifications may be made without departing from the spirit and scope of the disclosure as set forth in the following claims.

What is claimed is:

1. A wall anchor, comprising:
a head section comprising an external face separated from an internal face by a length along a central axis;
an outer surface having an infinite number of sides radially disposed about the central axis;
an access passage disposed through the head section along the central axis;
an inflatable bladder attached to the internal face of the head section, the inflatable bladder being in fluid communication with an external environment through the access passage;
wherein the head section is capable of being inserted into a hole disposed in a panel such that the external face of the wall anchor is capable of engaging an anterior surface of the panel;
wherein the inflatable bladder is dimensioned and arranged such that when a settable fluid is infused through the access passage into the inflatable bladder, the inflatable bladder expands such that the settable fluid, the inflatable bladder, or both are placed in contact with both the wall anchor and a posterior surface of the panel;
wherein the outer surface of the head section comprises at least one external thread extending outwardly away from the outer surface; and
wherein the at least one external thread is dimensioned and arranged such that rotation of the head section within the hole engages the external face of the wall anchor with an anterior surface of the panel.

2. The wall anchor of claim 1, further comprising one or more lateral passages in fluid communication with the access passage and an external environment.

3. The wall anchor of claim 1, wherein the inflatable bladder comprises an expandable polyolefin tube.

4. The wall anchor of claim 1, wherein the inflatable bladder comprises an expandable perforated tube.

5. The wall anchor of claim 1, wherein the settable fluid comprises a rigid foam precursor.

6. The wall anchor of claim 1, wherein the settable fluid comprises an adhesive.

7. The wall anchor of claim 1, wherein the settable fluid comprises a polyurethane adhesive, an epoxy resin, a polyester resin, a methacrylate resin, or a combination thereof.

8. The wall anchor of claim 1, wherein the access passage is threaded.

9. The wall anchor of claim 1, wherein the wall anchor inserted into an appropriately sized hole in a standard type X 5/8" drywall panel which has been infused with a polyurethane glue is capable of supporting at least about 10 pounds static force.

10. The wall anchor of claim 9, wherein the wall anchor is capable of supporting at least about 50 pounds static force.

11. The wall anchor of claim 1, further comprising a plug, the plug comprising a nipple protruding from a face of the plug, wherein the nipple is dimensioned to frictionally engage the access passage, the external face, or both of the wall anchor to obscure the wall anchor from view.

12. The wall anchor of claim 11, wherein the plug further comprises an adhesive disposed on the face of the plug comprising the nipple.

13. A method to attach a wall anchor to a panel, comprising the steps of:
forming a hole in a panel;
inserting a wall anchor into the hole, wherein the wall anchor comprises a head section comprising an external face separated from an internal face by a length along a central axis;

an outer surface having an infinite number of sides radially disposed about the central axis and comprising at least one external thread extending outwardly away from the outer surface which is dimensioned and arranged such that rotation of the head section within the hole engages the external face of the wall anchor with an anterior surface of the panel;

an access passage disposed through the head section along the central axis;

an inflatable bladder attached to the internal face of the head section, the inflatable bladder being in fluid communication with an external environment through the access passage;

rotating the wall anchor within the hole in an amount sufficient to engage the external face of the wall anchor with an anterior surface of the panel; and infusing a settable fluid through the access passage in an amount sufficient to at least partially expand the inflatable bladder such that the settable fluid, the inflatable bladder, or both are placed in contact with both the wall anchor and a posterior surface of the panel.

14. A removal tool for removing a wall anchor comprising a head section comprising an external face separated from an internal face by a length along a central axis; an outer surface having an infinite number of sides radially disposed about the central axis; an access passage disposed through the head section along the central axis; an inflatable bladder attached to the internal face of the head section, the inflatable bladder being in fluid communication with an external environment through the access passage; wherein the head section is capable of being inserted into a hole disposed in a panel such that the external face of the wall anchor is capable of engaging an anterior surface of the panel; wherein the inflatable bladder is dimensioned and arranged such that when a settable fluid is infused through the access passage into the inflatable bladder, the inflatable bladder expands such that the settable fluid, the inflatable bladder, or both are placed in contact with both the wall anchor and a posterior surface of the panel; the removal tool comprising:

a main shaft comprising a hole saw positioned radially around the main shaft at a first end, the hole saw having an inner diameter equal to or greater than an outer diameter of the external face of the wall anchor; a pilot rod extending along the axis of the main shaft beyond a face of the hole saw, the pilot rod being dimensioned to frictionally engage the access passage in the wall anchor.

15. The removal tool according to claim 14, wherein the pilot rod is threaded on the end extending beyond the hole saw.

16. A method to remove a wall anchor engaged with a panel, wherein the wall anchor comprises a head section comprising an external face separated from an internal face by a length along a central axis; an outer surface having an infinite number of sides radially disposed about the central axis; an access passage disposed through the head section along the central axis; an inflatable bladder attached to the internal face of the head section, the inflatable bladder being in fluid communication with an external environment through the access passage; wherein the head section is capable of being inserted into a hole disposed in a panel such that the external face of the wall anchor is capable of engaging an anterior surface of the panel; and wherein the inflatable bladder is dimensioned and arranged such that when a settable fluid is infused through the access passage into the inflatable bladder, the inflatable bladder expands such that the settable fluid, the inflatable bladder, or both are placed in contact with both the wall anchor and a posterior surface of the panel; comprising rotating a removal tool, wherein the removal tool comprises a main shaft comprising a hole saw positioned radially around the main shaft at a first end, the hole saw having an inner diameter equal to or greater than an outer diameter of the external face of the wall anchor, and a pilot rod extending along the axis of the main shaft beyond a face of the hole saw, the pilot rod being dimensioned to frictionally engage the access passage in the wall anchor, wherein in the removal tool is rotated while guiding the pilot rod into an access passage of a wall anchor such that the hole saw engages and cuts a hole in the panel circumscribing the wall anchor; followed by removing the removal tool from the hole along with the wall anchor.

17. A wall anchor, comprising:

a head section comprising an external face separated from an internal face by a length along a central axis;

an outer surface having an infinite number of sides radially disposed about the central axis;

an access passage disposed through the head section along the central axis;

an inflatable bladder attached to the internal face of the head section, the inflatable bladder being in fluid communication with an external environment through the access passage;

wherein the head section is capable of being inserted into a hole disposed in a panel such that the external face of the wall anchor is capable of engaging an anterior surface of the panel;

wherein the inflatable bladder is dimensioned and arranged such that when a settable fluid is infused through the access passage into the inflatable bladder, the inflatable bladder expands such that the settable fluid, the inflatable bladder, or both are placed in contact with both the wall anchor and a posterior surface of the panel; and wherein the inflatable bladder comprises an expandable perforated tube.

18. The wall anchor of claim 17, wherein the access passage is threaded.

19. The wall anchor of claim 17, wherein the wall anchor inserted into an appropriately sized hole in a standard type X 5/8" drywall panel which has been infused with a polyurethane glue is capable of supporting at least about 50 pounds static force.

20. The wall anchor of claim 17, further comprising a plug, the plug comprising a nipple protruding from a face of the plug, wherein the nipple is dimensioned to frictionally engage the access passage, the external face, or both of the wall anchor to obscure the wall anchor from view.

* * * * *